United States Patent [19]

Chase et al.

[11] 4,357,702
[45] Nov. 2, 1982

[54] ERROR CORRECTING APPARATUS

[75] Inventors: David Chase, Needham; Richard Spencer, Wellesley, both of Mass.

[73] Assignee: C.N.R., Inc., Needham Heights, Mass.

[21] Appl. No.: 211,173

[22] Filed: Nov. 28, 1980

[51] Int. Cl.$^3$ .......................... G06F 11/00; G11B 5/44
[52] U.S. Cl. .......................................... 371/1; 360/26; 371/47
[58] Field of Search .................. 371/1, 47, 38; 360/26; 364/200, 900

[56] References Cited

U.S. PATENT DOCUMENTS

| | | | |
|---|---|---|---|
| 3,708,783 | 1/1973 | Hedin | 371/1 |
| 3,789,400 | 1/1974 | Towns | 360/26 |
| 4,027,283 | 5/1977 | Tang | 371/47 |
| 4,044,329 | 8/1977 | Besenfelder et al. | 371/1 |
| 4,314,355 | 2/1982 | Leighou et al. | 360/26 |

OTHER PUBLICATIONS

Bruce LeBoss, Fast Tapes Getting Fast Error Correction, Electronics, Jun. 19, 1980, p. 46.
R. H. Severt, Encoding Schemes Support High Density Digital Data Recording, Computer Design, May 1980, pp. 181–189.
G. H. Schulze, How Accurate is Hi-Density Recording?, Control Engineering, Nov. 1978, pp. 52–55.
A. P. Herff, Error Detection and Correction for Mag Tape Recording, Digital Design, Jul. 1978, p. 16.

*Primary Examiner*—Charles E. Atkinson
*Attorney, Agent, or Firm*—Wolf, Greenfield & Sacks

[57] ABSTRACT

A multiple track tape recording system as disclosed in which the data recorded in each track is coded to allow for error correction and skew correction. The skew correction is done with a code which also can be used for error correction. Thus the system overhead required for skew and error correction is reduced. The data in each tape track is first divided into data blocks of equal length. An error-correcting parity word is computed from the data bits in the data block and appended to each data block to form a code word.

During the decoding operation, each tape track is fed through a first-in, first-out buffer memory (FIFO) and examined for valid code words. When a code word is detected the output of the FIFO for that track is stopped. After code words have been detected on all tracks the FIFO's are started in synchronisms, thus correcting for skew and synchronization errors.

The code also allows for detection of both random and burst errors on each of the multiple recorded tracks. An additional error correcting decoder utilizing an additional recorded track is used to correct the detected errors.

29 Claims, 12 Drawing Figures

Fig. 3 CODING SYSTEM BLOCK DIAGRAM

Fig. 5 FIFO AND 240-BIT DELAY

INNER ENCODER/DECODER FEEDBACK REGISTER AND ERROR DETECTION CIRCUITS

TIMING CIRCUITS

Fig. 9 INNER ENCODER/DECODER RESYNCHRONIZATION CIRCUITS

ENCODING WAVEFORM NUMBERS INDICATING THAT TIME INTERVALS ARE IN UNITS OF PERIODS OF THE ENCODED DATA RATE CLOCK, ENCK

DECODING WAVEFORMS

ERROR CORRECTING APPARATUS

FIELD OF THE INVENTION

This invention relates in general to the synchronization and correction of errors in multiple channel information transmission or recording systems, and, in particular, to multiple track magnetic tape recording systems.

BACKGROUND OF THE INVENTION

Modern digital data systems typically represent information as variable patterns of two (or more) state cells called "bits". The bits are usually arranged in fixed-length patterns called data "words". Each word corresponds to the particular piece of data which is to be transmitted, recorded, or processed by digital apparatus. In order to transmit information from one point to another or record information on a storage medium, a serial stream of data bits representing an information flow through a transmission channel or into a storage medium is processed by the apparatus. However, in order to transmit or store a large quantity of information in a short time the number of bits per second processed by the transmission channel or the storage device must be very high. Frequently it is desired to transmit or record information at a higher rate than the capacity of present day transmission channels or recording systems. One way to transmit or record information at a high rate without exceeding the device information processing capability is to divide the data stream which is to be transmitted or recorded into a number of "channels" or "tracks" which are then transmitted or recorded in parallel This division results in a transmission or recording rate on each channel that is lower than the channel capacity yet the overall transmission or recording rate is acceptably high.

As an example, a high rate data stream may be recorded on multiple tracks of a magnetic tape. The incoming data stream is divided into several parallel data streams by a well-known multiplexing arrangement so that a first data word is recorded on a first track, the next data word is recorded on a second track, and so on. The tracks are all located on the same tape and are therefore maintained in the proper sequence. When the data is to be read off the tape the first word on the first track is read off, the corresponding word on the next track is read off next in sequence until the data stream is reconstructed. However, in a multiple track recording arrangement several problems arise. One serious problem is "skew". A skew condition results when data words which are supposed to be recorded in corresponding positions in each track start at different points on the tape. When a skew condition is present the circuitry which reads the information from the magnetic tape must be able to decide which words correspond so that the words can be read off in the proper sequence. Other problems often occur, for example, there are often random errors on the tape caused by malfunctions of the tape recorder circuitry or noise. These errors must be detected and corrected. Another problem is "track dropout" which occurs when a track stops recording for some reason, for example, circuit failure or imperfections in the magnetic tape. The data tracks must also be synchronized from track to track. Finally, the nature of the data itself may result in failure of the reproduction system. For example, a long string of logical "0"s or "1"s may result in an effective D.C. level in the data which cannot be processed by the recording or transmitting circuitry. Thus the encoding circuitry must be able to control the frequency spectrum of the data.

Therefore, when digital data is recorded on multiple tracks of magnetic tape, the following problems must be solved for a faithful reproduction of the recorded data:

1—Track-to-track skew must be detected and corrected
2—There must be initial synchronization of all multiple tracks
3—There must be detection and correction of a loss of synchronization on each track
4—There must be detection and correction of isolated (random) errors and burst errors on multiple tracks
5—There must be frequency spectrum control.

PRIOR ART

The prior art typically solves the first three of the above problems by insertion of a fixed "synchronizing" pattern between blocks of data recorded on each track. For example, in some prior art systems, a predetermined 50-bit synchronizing pattern may be inserted after a data word consisting of 500 data bits. In this system, the addition of these additional synchronizing bits, which carry no data information, corresponds to an "overhead" (non-information bits/information bits) of 10%. The locations of the synchronization pattern on each track is used for track-to-track skew correction and initial synchronization. A loss of synchronization on a given track is detected by a change in the location of predetermined sync pattern. Additional bits must be also be added for detection and correction of random and burst errors, further increasing the system overhead. Frequency spectrum control is achieved by using well-known codes which prevent long data-caused D.C. intervals e.g., Miller codes, Miller-squared codes, randomized NRZ, and enhanced NRZ codes. Most of these well-known coding methods, with the exception of randomized NRZ, reduce the data throughput rate as a consequence of the extra bits required for frequency spectrum control. Thus, in most prior art digital tape recording systems, many extra non-data-carrying bits must be added to the data bits in order to achieve the necessary synchronization, skew correction, error detection and correction, and (in most cases) frequency spectrum control.

SUMMARY OF THE INVENTION

In the present invention, data words present in the data stream to be processed are divided into blocks and a parity word which is computed from the data is appended to each data block. This coding scheme is useful for solving all five of the problems. In order to do this a two-stage (inner and outer) coding approach is used.

Specifically, digital information to be transmitted or recorded is divided into a number of channels or tracks by well-known methods. Subsequently, in accordance with well-known methods, a corresponding bit position in each of the tracks the data bits is sampled and a mathematical function is performed on the sampled bits to produce a parity bit or bits. The parity bits are encoded in one or more additional tracks which run parallel to the data tracks and are usually recorded on the same tape track or are transmitted over the same data channel. This process is termed an "outer" coding operation.

More specifically, information to be recorded or transmitted is encoded with an (N-K) "outer" code. The number N is typically chosen to be a submultiple, or exactly equal, to the total number of tracks or channels used for recording or transmitting the data, respectively (including data and parity tracks to be recorded). In a typical example, N may be in the range of 5 to 50, and (N-K) may be 1 or 2. Of the N tracks or channels, K tracks are used for recording or transmitting data. At each bit position, the bits in each of the K data tracks or channels form a K-bit data block. N-K parity bits are computed from the K-bit data word and recorded in the N-K remaining channels or tracks. Thus, the N bits of each "outer" codeword are each assigned to one of N parallel recording tracks or data channels.

Advantageously, according to the invention, the data in each of the encoded channels is broken up into a number of multiple bit data word blocks. A fixed length parity word is appended to each block. The data word block and the associated parity word together form a "codeword". In accordance with the invention, the parity information is not a fixed, predetermined code but is calculated from, and depends on, the information contained in the data block. In addition, for frequency spectrum control a fixed bit pattern (called a "coset") is added bit by bit, (modulo-2) to the codeword. The coset is carefully chosen to contain a random mix of logical "1"s and "0"s and its addition to the codeword prevents a D.C. level problem from occurring.

Specifically, the N tracks of encoded data and associated parity words produced by the "outer" encoder are provided to an "inner" encoder where the data on each track (including the parity track) is further encoded with an (n,k) code. a typical set of values for this "inner" code may be n=240 and k=216, which corresponds to a parity word of (n-k)=24 bits for every 216 data bits.

In accordance with the invention, the information recorded on the multiple channels is decoded to achieve skew detection and correction, synchronization and error correction without the fixed synchronization pattern required by the prior art. Specifically, the stream of codewords on each of the parallel data tracks must be synchronized before error detection can be accomplished. Synchronization is accomplished by reading into a linear feedback shift register associated with each data track, a sequence of n bits. A mathematical function or "syndrome" is calculated from the sequence of n bits. According to well-known coding theory, the syndrome indicates when the sequence of n bits constitutes a valid codeword.

Advantageously, in accordance with the invention, if the syndrome calculations indicate that a valid codeword is not present a new syndrome is calculated in a bit-by-bit fashion from the next bit in the incoming sequence. Specifically, a single new bit is shifted into the register and the single oldest bit is shifted out. The effects on the syndrome already calculated which were produced by the bit which was shifted out of the register are subtracted from the syndrome and the effect of the new bit which is shifted into the register is added to the syndrome calculation to produce a new syndrome. The new syndrome thus corresponds to the bit sequence now in the shift register.

The shifting process continues until the calculated syndrome indicates that a valid codeword has been detected. At that point the shifting of bits out of the FIFO stops until valid codewords have been detected on all other channels. When valid codewords are detected on all channels, the contents of all FIFOs are shifted out simultaneously, producing synchronized signals in which track-to-track skew has been eliminated.

DETAILED DESCRIPTION OF THE INVENTION

Figure 1:
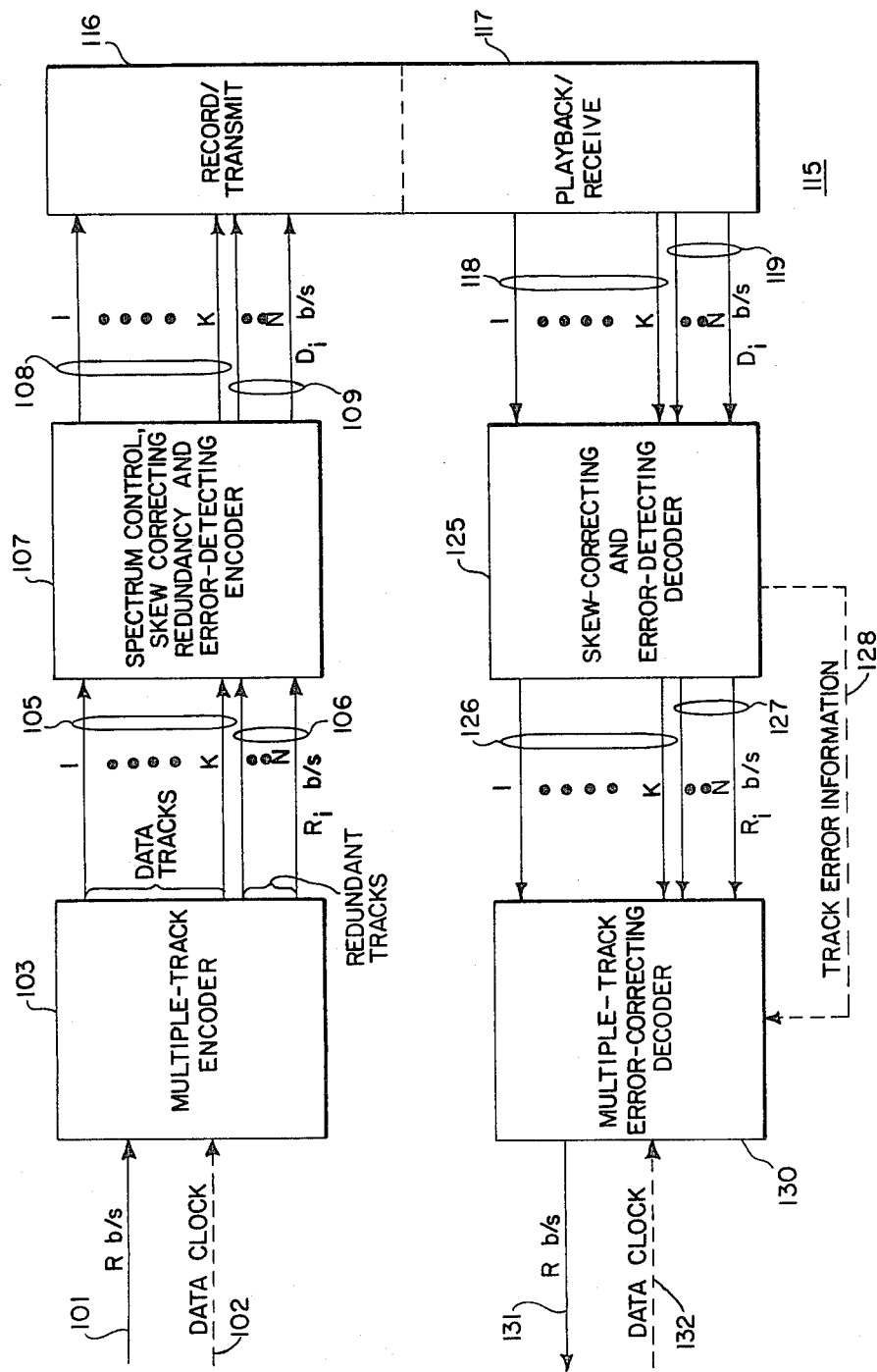
FIG. 1 shows a block diagram of a multiple channel digital storage or transmission system utilizing the invention.

Referring to FIG. 1 of the drawing, data to be stored or transmitted through a digital data processing system containing error correcting apparatus according to the invention enters the system via lead 101 at the lefthand side of the Figure. This data (which is produced by sources not shown on the figure) may be encoded in binary form in the form of 1's and 0's or in any other suitable code, all of which are well-known to the art. Data is typically provided in serial fashion at a rate which may be represented as R bits per second. In addition, a data clock is provided from the data source (not shown) on lead 102. This clock is used to clock data into the apparatus at the incoming data rate of R bits per second. The data on lead 101 and the clock signals on lead 102 are provided to an encoder 103. This encoder is of well-known design and divides the incoming data stream up into K separate data tracks or channels 105. Encoder 103, in addition, performs a mathematical operation on each bit position in tracks 105 to produce a parity bit or bits which are inserted in one or more redundant or parity tracks 106. The K data tracks and the N-K redundant (parity) tracks each contain information in a continuous serial form at a bit rate $R_i$ which is equal to the original bit rate divided by the number of tracks K.

Data tracks 105 and parity tracks 106 are provided to an another encoder 107. Advantageously, this encoder breaks the continuous data stream in tracks 105 and 106 up into data "blocks" of fixed, predetermined length. The encoder then computes a "parity word" based on the data bits in each block and inserts the parity word after each corresponding data block. This operation results in K data tracks 108 which contain "codewords" each consisting of "data block" plus an appended parity block and parity tracks 109, each of which consists of a parity data block plus an appended parity code word. The data rate on these tracks ($D_i$) is somewhat greater than the incoming data rate ($R_i$) since additional parity words are inserted onto the data stream.

Encoded data tracks 108 and parity tracks 109 are provided to a data processing system which may be either a data storage system or a data transmission channel 115 that either records or stores the information according to well-known principles. For example, the data processing apparatus may be a satellite system or multiple track magnetic tape recorder. Tracks 108 and 109 enter the record or transmit section 116 of the data processing system.

After transmission or storage in the data processing system, the information is received or retrieved by the playback/receive portion 117 of the data processing system 115. The playback/receive section produces K data tracks 118 and N-K parity tracks 119. If the processing system 115 were theoretically perfect then data tracks 118 would be identical to data tracks 108 and parity tracks 119 would be identical to parity tracks 109. However, due to noise and errors in system 115 there may be several types of errors introduced into the tracks produced by playback/receive portion 117. Tracks 118 and 119 are provided to a skew correcting and error correcting decoder 125. By examining the data and parity sections of the codewords as will hereinafter be described decoder 125 detects and corrects skew in tracks 118 and 119 and provides information over channel 128 concerning the identity of one of channels 1 through K that contains an error. The de-skewed and synchronized data tracks 126 and parity tracks 127 are provided to a multiple track error-correcting decoder 130.

Decoder 130 utilizes the track error information provided by channel 128 and the information contained in the parity tracks 127 to determine which bit in which track is in error and correct the error. Channels 1 through K are then multiplexed into a single outgoing channel 131 which contains data at the original rate of R bits per second. This data is clocked out of decoder 130 under control of a data clock 132 provided by the data utilization device, which is not shown in the figure.

Figure 2:
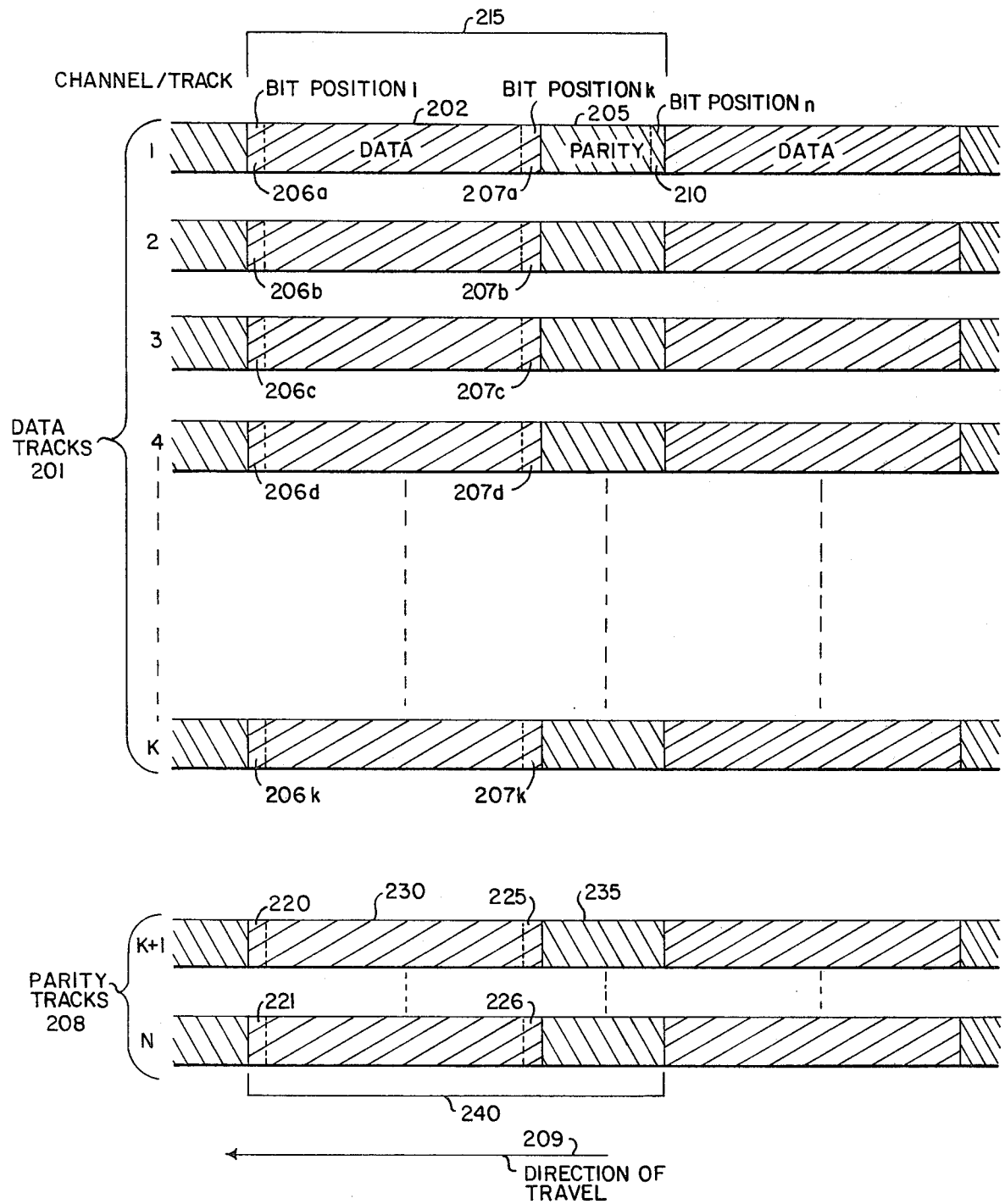
FIG. 2 of the drawing shows a number of data tracks as encoded by the invention.

FIG. 2 shows the arrangement of the data and parity bits on tracks 108 and 109 or tracks 118 and 119. K data tracks 201 are arranged in parallel with N-K parity tracks 208. On each track, for example, track 1, there are a continuous stream of codewords of which the structure is similar, but the actual information content differs depending on the incoming information stream. Illustratively, codeword 215 is made up of two sections: data section 202 and appended parity section 205. In figure 2 these sections are shown separated by a heavy line for clarity. However, in actual operation the data and parity sections are a continuous stream and no such division occurs. Data section 202 consists of k bits arranged in sequence which contain the encoded data. Parity section 205 consists of n-k bits, ending with bit position n (210). Parity bits 205 are derived from the data bits 202 in accordance with any of a number of well-known mathematical coding function. Bits 205 may, for example, be a well-known Bose-Chaudhuri-Hocquenghem (BCH) code computed over bits 202. Also included with the data tracks are a number of parity tracks 208. These are N-K parity tracks and they are arranged in a similar configuration of the data tracks 201. In particular, each parity track consists of a sequence of parity codewords such as codeword 240 which contains a data portion 230 and a parity portion 235. However, the data portion 230 and the parity portion 235 of the parity codeword 240 are mathematically related to data tracks 201. Specifically, parity bits 220 and 221 are related to bits in the first position each of the data tracks K, that is, bits 206a through 206k. For example, assuming there is only one parity track 208, bit 220 may be related to bits 206a through 206k by a simple modulo-2 addition in accordance with the well-known method of computing parity. Other well-known functions may also be used. Similarly, bits 225 and 226 in parity tracks 208 are related by the same mathematical function to bits 207a through 207k. The parity bits in section 235 are likewise related to the parity bits in the parity sections of the data tracks 201. In all of the tracks the codewords move in the direction of travel shown by arrow 209. A specific embodiment of a system utilizing this invention is illustratively shown in block diagram form in FIG. 3. In the illustrative encoding system, a codeword 215 may consist of 240 bits in which the data portion is 216 bits and the parity portion 205 is 24 bits. In addition, in the illustrative description there are eight data tracks and one parity track. This arrangement is used for both encoding and decoding of the digital information.

During the encoding operation, an external data utilization device (not shown) provides input data on eight parallel tracks 301, an encoded data rate clock (ENCK) at the incoming data rate, an information clock (INFO RATE CLOCK) operating at 9/10 of ENCK clock signal, a signal which informs the encoding apparatus whether to encode or decode (DECODE) and a start signal (RUN). These signals are shown at the left hand side of FIG. 3.

In encoding, the eight parallel bit streams 301 are encoded by an outer encoder 305 under control of the associated clock (INFO RATE CLOCK) 302 into nine bit streams 310 consisting of the eight data streams 311 (which pass through encoder 305 unaltered) and a parity bit stream 312. Encoder 305 chooses the parity bit 312 so that the overall parity of the nine output bit streams 310 is even.

When the apparatus is encoding, the DECODE signal 320 provided by utilization apparatus (not shown) is at logic "0". The DECODE signal is provided to eight multiplexers 325-332 causing them to apply each of data bit streams 311 to the data input of a corresponding first-in-first-out buffer memory (FIFO) 335-342. In addition, the parity bit stream on lead 312 is provided to mulitplexer 333 and, under control of the DECODE signal, to FIFO 343. The data is clocked into FIFO's 335-343 by the INFO RATE CLOCK 302 via multiplexers located in the timing and synch circuit 351 under control of the DECODE SIGNAL, as will hereinafter be explained. Data is clocked out of FIFOS 335-343 by SHIFT OUT CLOCKS 350 produced by timing circuit 351 via gating logic in the inner encoder/decoders 380-388 at a bit rate equal to 10/9 that of the INFO RATE CLOCK 302. The faster shift out rate is to allow for the insertion of the computed parity bits between data word blocks. In the illustrative embodiment 216 data bits are shifted out and then 24 parity bits are inserted, forming a codeword of length 240 bits. Specifically, SHIFT OUT CLOCKS 350 are gated by a signal which inhibits SHIFT OUT CLOCK 350 periodically for 24 successive bit times out of every 240 bit times. The FIFO outputs, 335-363 thus consist of groups of 216 bits at the INFO RATE CLOCK rate, with gaps of 24 bit times between successive groups.

During the encoding operation the outputs 355–363 of FIFO's 335–343 are provided to a respective one of inner encoder/decoders 380–388, directly via leads 370–378. Each inner encoder/decoder 380–388, as will hereinafter be more fully described includes a feedback shift register (shown in detail in FIG. 6) with feedback taps determined by a particular code used to encode the data.

The shift register in each of encoder/decoders 380–388 is used to produce a parity word which is inserted in the 24 bit gap produced by FIFO's 335–343. The entire codeword consisting of the data portion and the parity portion with coset added (modulo-2) appears at the outputs 390 of encoder/decoders 380–388.

During the decoding operation, the external utilization device provides the encoding apparatus with playback data, and the ENCK, DECODE and RUN signals as before and additional PLAYBACK CLOCK signals which are at the playback data rate. During the decoding operation a "1" signal is present on DECODE line 320. This "1" signal causes multiplexers 325–332 to apply the incoming playback data on leads 303 to FIFO's 335–343. The playback data is shifted into FIFO's 335–343 under control of the associated playback clocks which are provided to FIFOs 335–343 by the timing and synch circuit 351. During decoding FIFO's 335–343 are used to synchronize the data and correct track-to-track skew as will more fully be described herinafter. The input data stream to each FIFO is the playback data from one track output of the tape recorder, and the shift-in clock is the associated playback clock. After synchronization, the data in FIFO's 335–343 is shifted out at a steady rate simultaneously from each FIFO. Therefore during decoding the FIFO's 335–343 are partly filled and serve to compensate for timing differences (skew) among the signals from different tracks on the tape.

The outputs 355–363 of FIFO's 335–343 are provided directly via leads 370–378 to encoder/decoders 380–388 and also to delay circuits 391–399. Delay circuits 391–399 consist of a 240 bit shift register which delay the outputs of FIFO's 335–343 for a period of 240 bit intervals. As will be more fully described hereinafter, the direct and delayed inputs provided to encoder/decoders 380–388 allow the encoder/decoders to examine the incoming bit pattern one bit at a time and determine whether a valid code word has been detected. As each encoder/decoder detects a valid code word the shift out clock which is shifting out the associated FIFO is stopped. After valid code words have been detected on each of the channels the shift out clock is started in synchronism for all channels, resulting in skew correction.

Once synchronization has been established, the $\overline{\text{SYNZ}}$ outputs 390a of encoders/decoders 380–388 indicate whether a valid code word has been received on that channel or whether there is error on that channel. Outputs 390a are provided together with the delayed versions of the code words produced by delay circuits 391–399 to outer decoder 389. As will be more fully described hereinafter, outer decoder 389 utilizes the information on leads 390a to correct errors in the data producing an error free decoded data stream on its output leads 389a.

FIGS. 4–12 of the drawing relate to a specific illustrative embodiment of the invention. This embodiment consists of a multiple track tape recorder in which the order of the data read off the tape is the opposite to the order in which the data is stored on the tape.

Figure 4:
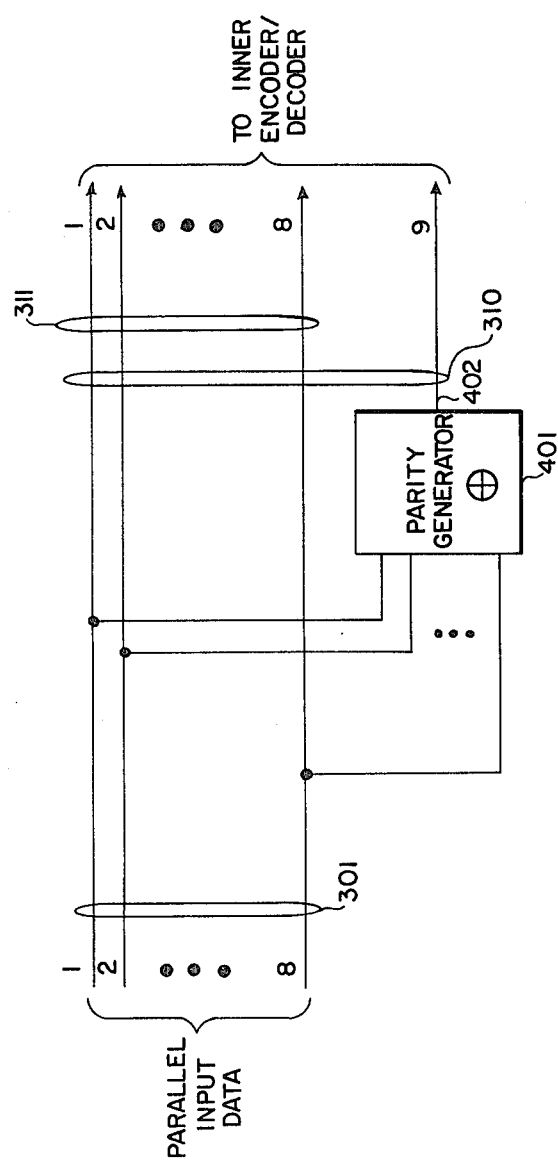
FIG. 4 shows a circuit diagram of an "outer" encoder.

FIG. 4 of the drawing shows a detailed schematic diagram of the outer encoder 305. Parallel input data on leads 301 is passed directly through the encoder and appears on the output leads 311. In addition, the input data on leads 301 is provided to parity generator 401 which is a well-known circuit consisting of a modulo-2 adder which adds a corresponding bit in each of the input data streams 301 to produce a corresponding parity bit on its output lead 402. The parity bit on lead 402 together with the data bits on leads 311 provide the output 310 of outer encoder 305.

Figure 5:
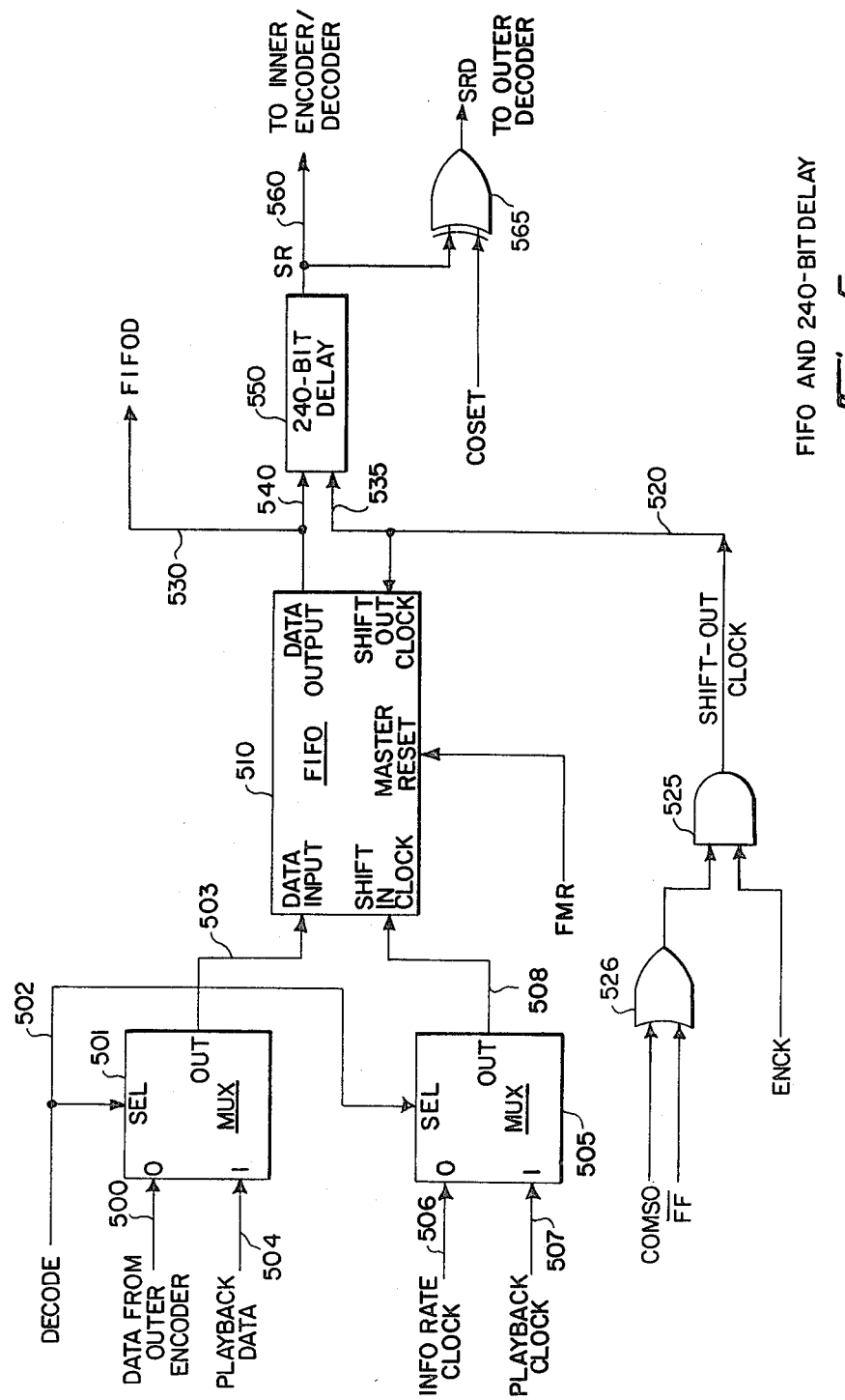
FIG. 5 shows a portion of an "inner" decoder/encoder circuit.
Figure 6:
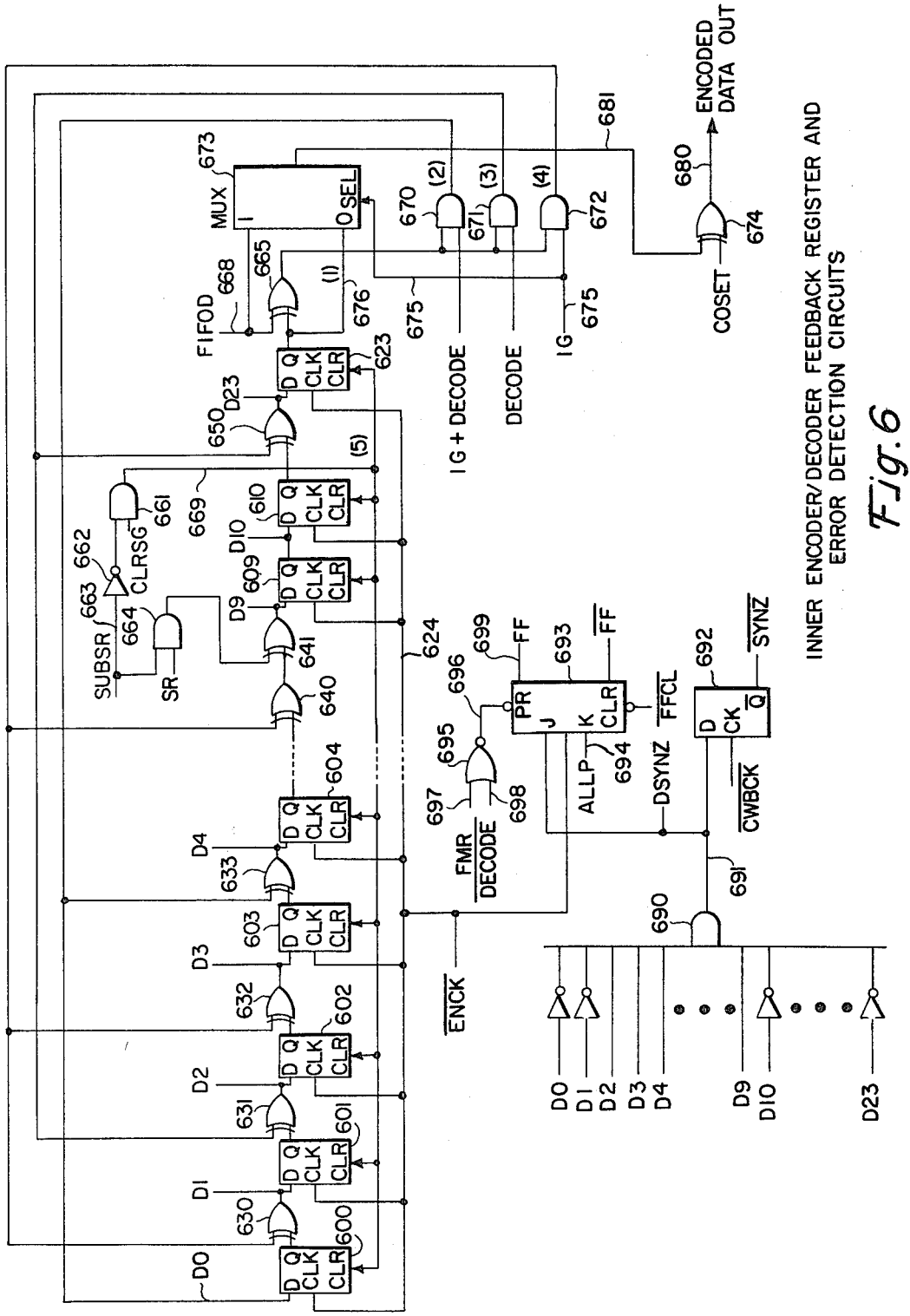
FIG. 6 shows the inner encoder/decoder feedback register and error detection circuits.

Outer encoder 305 provides signals to multiplexers 325–333 and FIFO's 335–343 which, in turn, supply outputs to encoders/decoders 380–388. FIGS. 5 and 6 show the detailed circuitry for the multiplexers, FIFO's and encoders/decoders for a single channel. Identical circuitry is used in each of the eight (8) data channels and the single parity channel shown in the illustrative embodiment.

Referring to FIG. 5, data from one channel of the outer encoder output 310 is applied via lead 500 to the 0 input of multiplexer 501. As previously described, DECODE lead 502 has a low signal thereon during the encoding operation. The low signal on lead 502 is applied to the select input and causes multiplexer 501 to connect the data on its 0 input to output 503 which, in turn, is connected to the data input of FIFO 510. The low signal on lead 502 is also applied to the select input of multiplexer 505 which causes it to connect to the INFO RATE CLOCK signal on its 0 input 506 to its output 508 which is, in turn, provided to the SHIFT IN CLOCK input of FIFO 510. Data from the outer encoder is thereby shifted through multiplexer 501 into FIFO 510 under control of the INFO RATE CLOCK on lead 506.

During encoding, data is clocked out of FIFO 510 at a bit rate determined by the encoded data rate clock, ENCK, which has a frequency equal to 10/9 that of the INFO RATE CLOCK.

Figure 8:
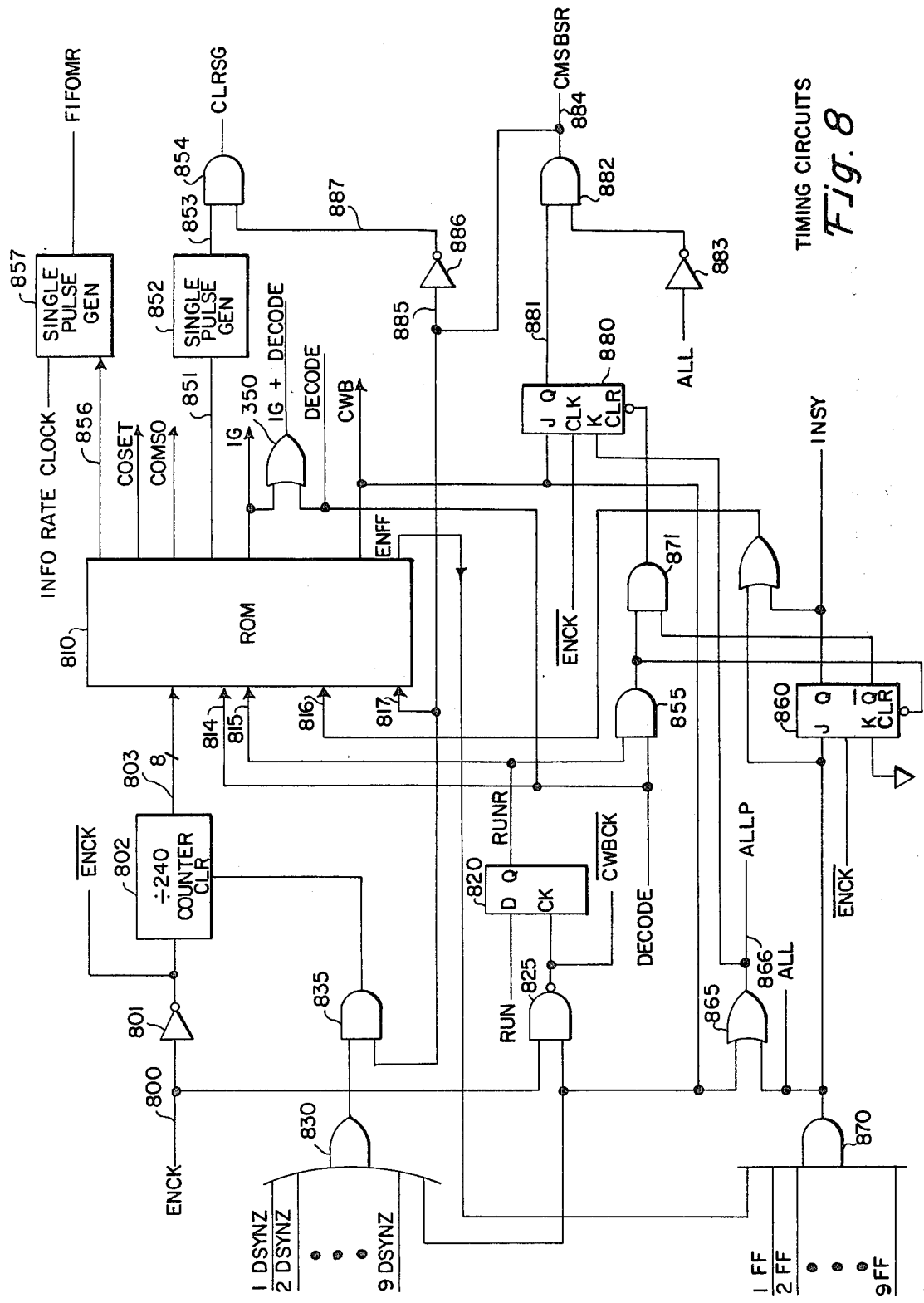
FIG. 8 is a schematic diagram of the timing circuit.

During encoding, the shifting of FIFO 510 in the operation of the rest of the circuitry is controlled by the timing circuit shown in FIG. 8. Circuitry in FIG. 8 receives the ENCK signal, the RUN signal and the DECODE signal generated by the external circuitry (not shown). From these signals the signals used in the internal timing of the error-correcting apparatus are derived as will be hereinafter described. During the description, reference will made to FIG. 10 which shows the signals produced by the timing apparatus which are used during the encoding operation. Referring to FIG. 8 the signal ENCK entering the unit in the external device on lead 800 is supplied to an inverter 801 which in turn applies the inverted signal $\overline{\text{ENCK}}$ to the count input of bit counter 802. Bit counter 802 is a divide by 240 counter which counts continuously throughout the encoding and decoding operation of the error correcting apparatus. The output 803 of bit counter 802 are provided to read only memory (ROM) 810. ROM 810 is programmed to provide various timing signals as will be hereinafter described. ROM 810 also receives as inputs the DECODE signal on lead 814 produced by the external utilization apparatus which puts the error-correcting circuitry in either an encode or a decode mode, a reclocked version of the RUN signal (RUN R) on its lead 815 as will be hereinafter described, and two other signals which will be described further on leads 816 and 817. When the circuitry is not in actual operation the bit counter 802 still counts continuously. Responsive to the outputs of bit counter, ROM 810 produces a pulse, high for one bit interval in duration, on its output CWB every 240 counts, the end of the pulse corresponding to a codeword boundary. The pulse on ROM output CWB supplied to the lower input of NAND gate 825 together with the signal ENCK which is high during the last part of each bit interval causes the output of NAND gate 825 to go low (i.e. to logic "0") and clock D flip-flop 820. The RUN signal produced by the external utilization apparatus is provided to the D input of flip flop 820 and thus the signal RUN R goes high at the beginning of a new code word. This operation is shown in lines B and C of FIG. 10. The transition from low to high of the RUN R signal indicates the beginning of the encoding operation.

During the resting state, (when RUNR is a logic "0") ROM 810 produces a signal COMSO on one of its outputs. This signal is high for approximately 160 counts of bit counter 802 and remains low for aproximately 80 bits. Also during the resting state, ROM 810 produces a signal on its output lead 856 which enables single pulse generator 857 to generate a pulse on its output lead, FIFOMR, which pulse (as shown in line G of FIG. 10) is a logic "1" for one information bit time as determined by the INFO RATE CLOCK. This pulse occurs during the first full information bit time following the switching of COMSO to a logic "0" (as shown in FIG. 10). The lead FIFOMR is connected, via lead 915 (in FIG. 9), to one input of AND gate 920 in each inner encoder/decoder. The other input of AND gate 920 is connected, via lead 907, to the output of OR gate 903, which is held "high" by a signal $\overline{\text{INSY}}$ (high during encoding) Gate 920 is therefore enabled to pass the pulse on lead FIFOMR, producing a similar pulse FMR at its output 921, which clears FIFO 510. After being cleared, approximately 70 bits are shifted into FIFO 510, whose shift-in clock runs continuously at the information bit rate in response to the INFO RATE CLOCK via multiplexer 505, while the shift out clock is stopped as described hereinafter. Thus, at the end of each cycle of the bit counter in the resting state, and in particular at the time RUNR becomes a logic "1", the FIFO associated with each inner encoder/decoder contains approximately 70 bits. When the RUNR signal on lead 815 to ROM 810, however, becomes high, FIFOMR (and therefore FMR) is a steady logic "0", and the signal COMSO changes its duty cycle so that it remains high for 216 counts of the bit counter 802 and becomes low for 24 counts. This operation is depicted in line E of FIG. 10. The signal COMSO is used during the encoding operation to shift data out of FIFO 510 as will be hereinafter described.

A SHIFT OUT CLOCK signal provided in FIFO 510 on lead 520 is produced from AND gate 525. AND gate 525 is enabled to allow the signal ENCK to be applied via lead 520 to the SHIFT OUT CLOCK input of FIFO 510 when either of signals COMSO or $\overline{\text{FF}}$ are high, which signals are provided to the input of OR gate 526. During the encoding operation signal FF is held low as will be hereinafter described. The signal COMSO changes as shown in the timing wave form in FIG. 10 and as previously described is high during the first 216 bit periods and low for the following 24 successive bit periods in ENCK. FIFO 510 therefore shifts out at the ENCK rate for 216 bit periods and stops for 24 bit periods. During the first 216 bits shifted out from the FIFO, the number of bits stored in the FIFO decreases to approximately 48 from its initial value of approximately 70, since bits are shifted in at 9/10 of the output rate. During the parity section, when no bits are shifted out, bits continue to be shifted in, bringing the number of stored bits up to the initial value of approximately 70 at the start of the next codeword. The FIFO, which, in this example, has a capacity of 128 bits, never becomes either full or empty, conditions that would cause loss of data bits. This operation then repeats. Thus, the output of FIFO 510 on lead 530 consists of repetitive bursts of 216 bits of data followed by 24 bit times which contain no data.

The output of FIFO 510 is provided via lead 530 to the inner encoder/decoder shown in FIG. 6.

During an encoding operation an inverted DECODE signal, $\overline{\text{DECODE}}$, is high and is provided via lead 698 to NOR gate 695 causing gate 695 to apply a low signal via lead 696 to the preset input of flip-flop 693. Responsive to the low signal at its input, flip-flop 693 produces a high signal at its output 699 which is to control the shifting of FIFO 510 as previously described. The encoder/decoder consists of a linear shift register with various feedback taps. It is designed to produce a parity section of 24 bits to be inserted into the 24 bit gap in the data stream produced by FIFO 510. Any one of a variety of well-known coding techniques may be used in this section. For example, the encoder of FIG. 6 may illustratively encode incoming data a in Bose-Chadaudhuri-Hocquenghem code. Shift registers with feedback to encode data such as that shown in FIG. 6 are well-known in the art and will not be described in great detail here. The feedback shift register consists of 24 D type flip-flops 600–623. The outputs of the first four flip-flops 600–603 are connected to the input of the succeeding flip-flop via an exclusive OR gate 630–633. The output of the ninth flip-flop (not shown) is connected to the input of the tenth flip-flop 609 via exclusive-OR gates 640 and 641. The outputs of the fifth through the eights and the tenth through the twenty-third flip-flop are connected either directly or via exclusive-OR gates to the succeeding flip-flop. Such connections are well-known in the art. The output of the twenty-third flip-flop is connected via an exclusive OR gate 650 to the input of the final flip-flop 623. The actual feedback taps selected on the shift register are determined by the specific code which is used in the encoding operation and their selection is well known. At the start of the encoding operation the shift register is cleared or set to all logic "0"s. Specifically, the signal SUBSR is at logic 0 during the encoding operation. This signal, provided on lead 663, is inverted by inverter 662 and applied as a high signal to the AND gate 661. AND gate 661 is therefore enabled permitting signal CLRSG, a brief pulse occuring during the first of the 216 information bits provided from the FIFO 510 as shown in line D of FIG. 10 to clear the D flip-flops 600 through 623 by applying a high signal to their clear inputs via lead 669. During the encoding operation incoming data from the output of FIFO 510 on lead 668 is added (modulo-2) to the output of shift register stage 623 by means of exclusive OR gate 665 to produce a signal that is fed back and added, modulo-2, to the outputs of selected shift register stages to produce the encoded parity word. Specifically, during shifting of the data signals from FIFO 510 into the inner encoder/decoder the information gate signal (IG shown in line F of FIG. 10 and produced by RDM 810 in FIG. 8) is high. The DECODE signal is low. The IG signal is ORed with the DECODE signal, by gate 850 in FIG. 8 and applied to AND gate 670. The IG signal is applied directly to AND gate 672. Gates 670 and 672 are therefore enabled and the output of exclusive OR gate 665 consisting of encoded data is passed via gates 670 and 672 to be fed back to the appropriate stages in the shift register. More specifically, the output of AND gate 670 is provided to the D-input of flip-flop 600 and the output of AND gate 672 is provided to exclusive-OR gates, such as 630, 632, and 640 which add the output (modulo-2) to the outputs of the flip-flops, such as 600, 602, and 608.

The information gate signal IG remains at logic "1" for 216 bit times coincident with the shifting of the data out of the FIFO 510 and becomes "0" for the remaining 24 bit times as shown in FIG. 10. Signal IG is also applied to the select input of multiplexer 673 via lead 675. During the first 216 bit times the high signal lead on 675 causes the output of FIFO 510 to be applied via lead 668 and multiplexer 673 to the exclusive OR gate 674 for further encoding as described below.

After each group of 216 bits from FIFO 510 has been shifted into the encoding shift register through multiplexer 673 the 24 bits contained in the shift register constitute the coded parity word. At this point signal IG becomes a logic "0" and the output of the shift register is shifted out via lead 676 and multiplexer 673 to exclusive OR gate 674 and thence into the encoded data out stream 680.

In order to provide frequency spectrum control and avoid a D.C. level condition which would result from a long string of zeros or ones in the data a predetermined sequence of ones and zeros is added (modulo-2) to the encoded data by exclusive OR gate 674. This predetermined set of ones and zeros is called a "coset". It consists of a string of ones and zeros which contains approximately a fifty percent mix of ones and zeros preventing any long data "0" or data "1" from producing a D.C. level. In addition, the coset is chosen so that it is not a valid codeword and therefore helps to synchronize the system and prevents a shifted version of a valid codeword from producing an improper "alias" of a valid codeword. Although many different cosets may be used in the system the particular coset which has been chosen for the illustrative system is as follows: (octal notation)
345461016003065713210373650457163744504730765 51-532075332070050 612472614316756205

The coset is produced in synchronism with the shifted data by ROM 810 in response to the incoming counts from bit counter 802.

The encoded data signal produced on the output 680 of exclusive OR gate 674 is provided to either the recording apparatus or the data transmission apparatus for utilization.

Decoding

Figure 11:
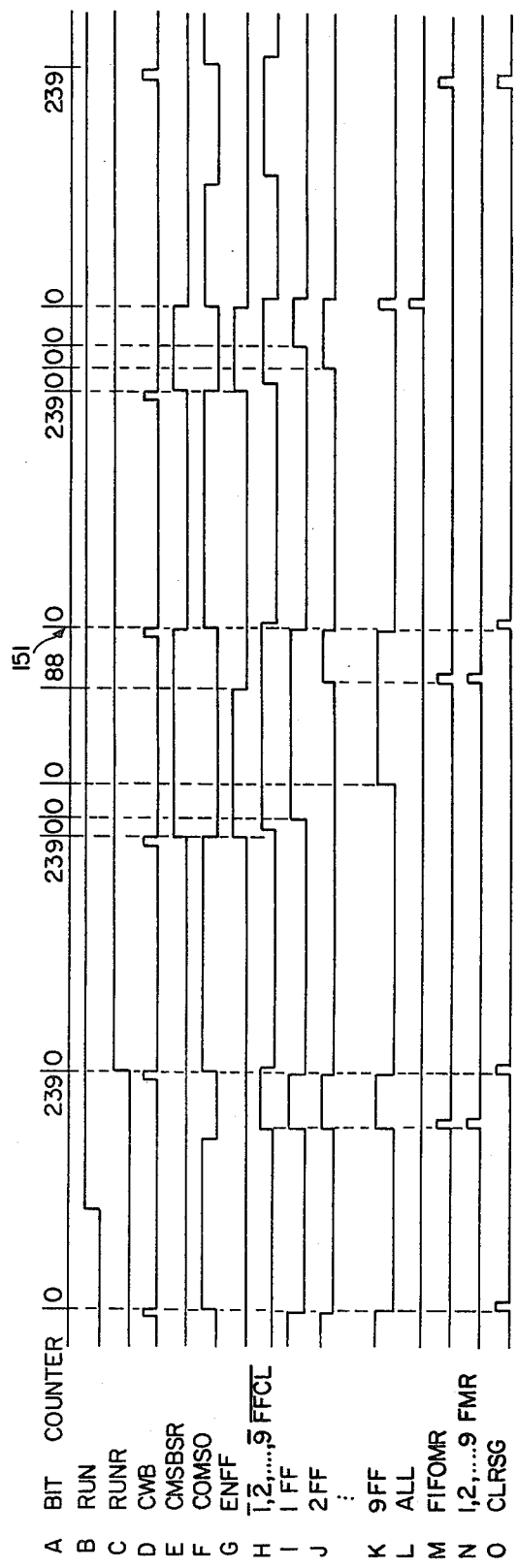
FIG. 11 shows the decoding waveforms produced by the circuitry during initial synchronization.
Figure 12:
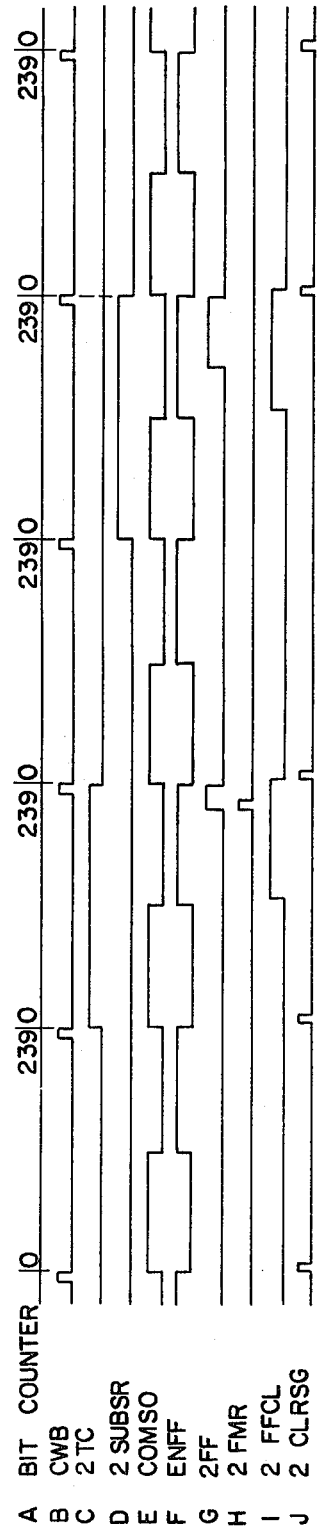
FIG. 12 shows the decoding waveforms produced by the circuitry during resynchronization

The same circuitry used during the encoding operation is also used for decoding. The wave forms used by the circuitry during the decoding operation are shown in FIGS. 11 and 12. From time to time these figures will be referred to.

Referring now to FIG. 5, during a decoding operation playback data is provided to the coding apparatus via lead 504 from a utilization apparatus (either from a storage apparatus or from a data transmission channel) as previously described. FIFO 510 is used during the decoding operation to achieve synchronization and to correct for track-to-track skew. During the decoding operation, the DECODE signal is a logic "1". Multiplexer 501 therefore connects the playback data on input lead 504 to its output 503 and thence to the data input of FIFO 510. FIFO 510 is provided with clock signals at its SHIFT IN CLOCK input via lead 508 from multiplexer 505. The SHIFT IN CLOCK signals are derived from input 507 of multiplexer 505 from the PLAYBACK CLOCK signals produced by the utilization apparatus.

As during the encoding operation, FIFO 510 is controlled by the timing circuit shown in FIG. 8, via the signal FF to correct for track-to-track skew and synchronization errors. The correction of skew and synchronizing of the system will be described more fully hereinafter.

Assuming for the moment that synchronization has been achieved, the signal FF becomes a steady logic "1". This causes OR gate 526 to apply a high signal to AND gate 525. The data clock signal ENCK is therefore applied by AND gate 525 and lead 520 to the SHIFT-OUT CLOCK input of FIFO 510. The outputs of FIFO 510 (which appear at the ENCK rate) are applied to the decoding circuitry via lead 530 and to a 240 bit delay circuit 550 by means of lead 540. The delayed output of the delay circuit 550 is also applied to the decoding circuit via lead 560.

During the decoding operation, the DECODE signal is a logic "1" and the IG signal is at a constant logic "0". After synchronization has been achieved and at times when a track is not being resynchronized following loss of synchronization, the signal SUBSR is also at a logic "0". Signal SUBSR is supplied via lead 663 to inverter 662 which applies a high signal to AND gate 661 to enable it. As shown in FIG. 11, the CLRSG signal becomes high for a short period during the first bit time of each 240 bit code word interval. ROM 810 produces a signal on lead 851 which triggers single pulse generator 852 to generate a pulse which is connected to an input of AND gate 854, via lead 853. The other input of AND gate 854 is held at a logic "1" at this time, via lead 887, by inverter 886 whose input is held at a logic "0" by signal CMSBSR via lead 885. The output of AND gate 854 produces signal CLRSG. Returning to FIG. 6, when the signal CLRSG becomes high AND gate 661 applies a high signal via its output lead 669 to the clear inputs of shift register flip flops 600–623, clearing them. Data bits on the output of FIFO 510 appearing on lead 668 are added (modulo-2) to the shift register output produced on lead 676 via exclusive-OR gate 665. During the decoding operation, the DECODE signal is high and the IG signal is low. AND gates 670 and 671 are therefore enabled. The output of exclusive-OR gate 665 is supplied via turned-on AND gates 670 and 671 as a feedback signal to the appropriate inputs in the shift register. For example, the outputs of AND gates 670 and 671 are fed back to the D-input of flip-flop 600 and, via exclusive-OR gate 631, to the D-input of flip flop 602 respectively.

The shift register flip-flops receive a clock signal at their clock inputs from lead 624, which is driven from signal $\overline{ENCK}$. The shifting operation continues in this way until a 240 bit word has been shifted through the register flip-flops. After the 240-bit word has been shifted in, the contents of the shift register are a mathematical function of the bits in that 240 bit word. This function is referred to in the art as a "syndrome". Specifically, in accordance with well-known coding theory, the computed syndrome is zero (the contents of the register is all zeroes) if a "valid" code word is received. By valid it is meant that a received parity word corresponds to the correct calculation of the parity word over the received data bits. Also, as is well known, the syndrome will include one or more ones if the word is not a valid code word. However, in the illustrative embodiment because of the added coset the contents of the register will not be all zeros after shifting in a valid code word with the added coset. But in the absence of any received errors, the pattern of ones and zeros in the shift register remaining after a 240 bit word is shifted in is the same for any valid code word.

Specifically, for the illustrative embodiment shown and the coset as previously described the shift register consisting of flip flops 600 through 623 will produce zeros at eleven outputs including its D0, D1, D10, and D23 outputs and a 1 at 13 outputs including outputs D2, D3, D4 and D9 if a valid codeword is shifted through the register. Outputs which are zeros for a valid codeword are applied via inverters to the inputs of AND gate 690; those which are ones are provided directly to AND gate 690 so that if the proper syndrome is present, AND gate 690 produces a high signal at its output 691 during the final bit of a valid codeword. This high signal is applied to the D-input of flip-flop 692. Flip-flop 692 receives the signal $\overline{\text{CWBCK}}$ at its clock input. The $\overline{\text{CWBCK}}$ signal is produced by NAND gate 825 in FIG. 8 when the CWB provided by ROM 810 at the end of each codeword interval and the ENCK signal are both high. This signal becomes low at the end of each code word and thus the high signal at the output of gate 690 is clocked into flip flop 692 and held for the duration of the following codeword. The output of the flip flop 692 ($\overline{\text{SYNZ}}$) serves as an erasure signal for use by the outer decoder as will be described hereinafter.

Figure 3:
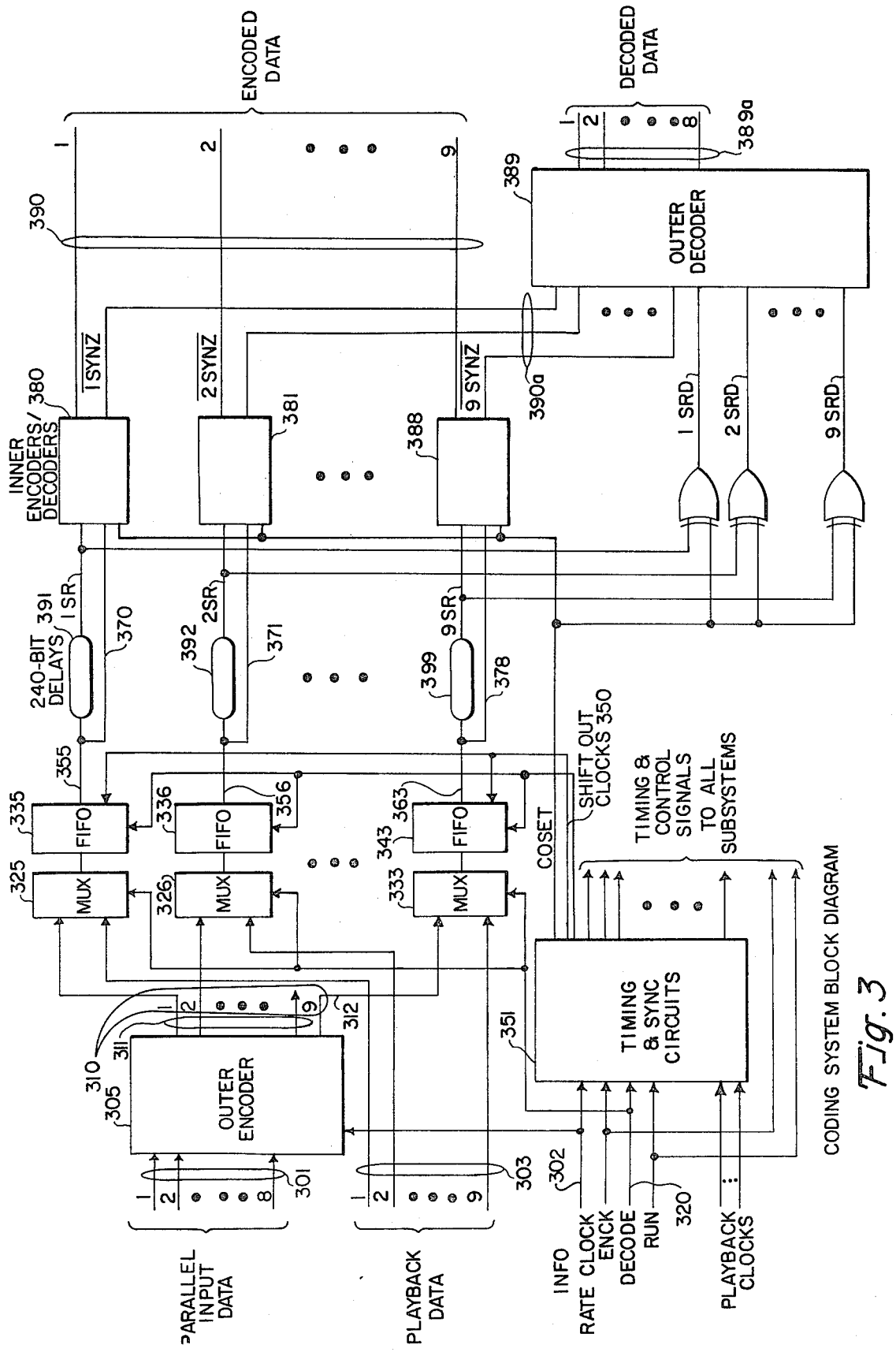
FIG. 3 is a block diagram of specific embodiment of the inventive encoding and decoding system as used in a multiple track tape recording system.
Figure 7:
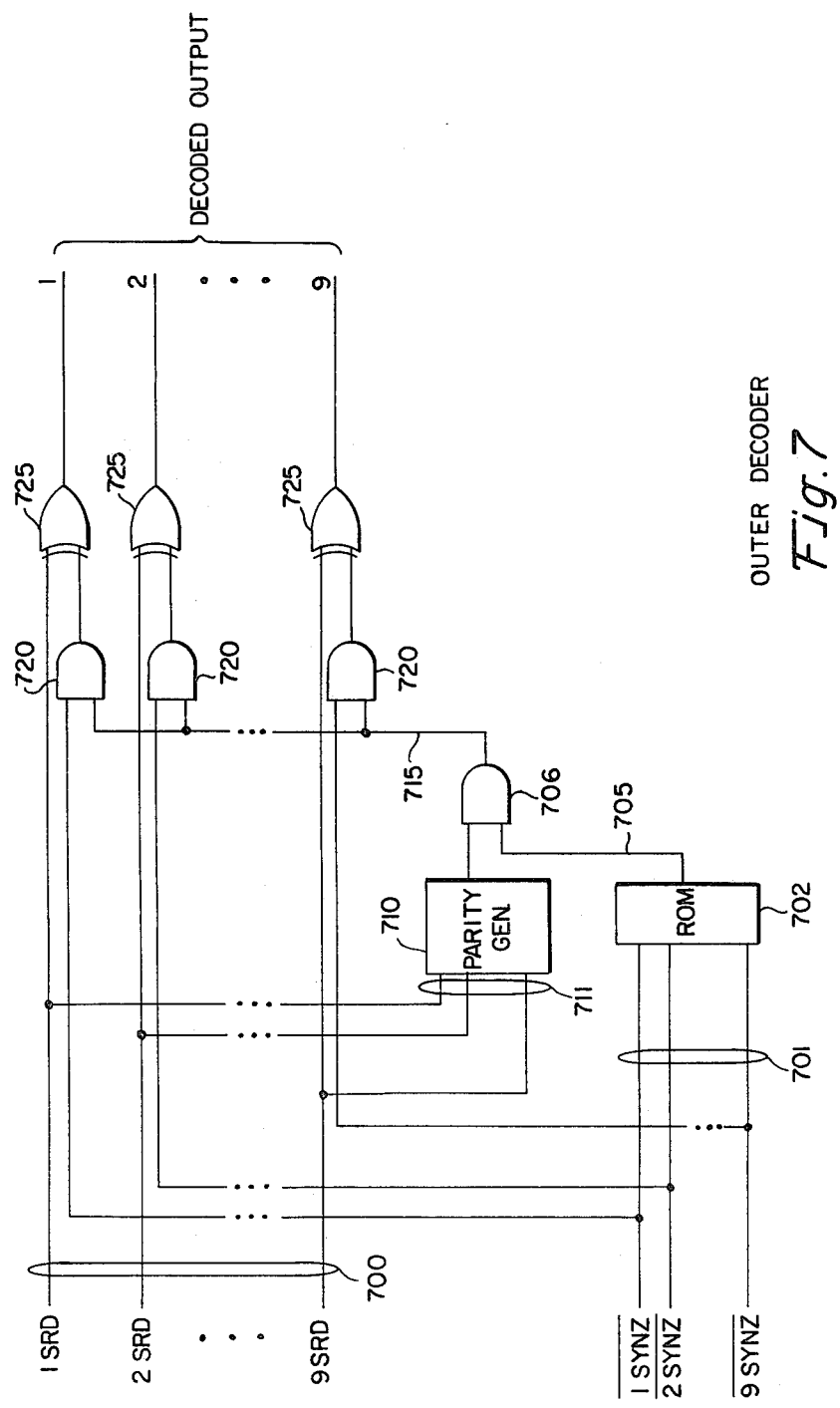
FIG. 7 is the circuit diagram of the outer decoder.

Referring to FIG. 3, the final stage of decoding is completed by the outer decoder 389 which is shown in detail in FIG. 7. The inputs to the outer decoder consists of 9 data streams 700 consisting of data streams 1SRD-9SRD. These data streams are produced from the outputs of the 240-bit delay circuits 550 (FIG. 5) by the addition (modulo-2) of the coset to the output of FIFO 510 delayed 240 bit times. The addition (modulo-2) of the coset removes the effect of the coset and returns the original data. Specifically, in FIG. 5 the coset word produced by ROM 810 is added to the output of delay circuit 550 via exclusive-OR gate 565.

In addition, 9 "erasure" signals 701 consisting of signals $\overline{1 \text{ SYNZ}}$ through $\overline{9 \text{ SYNZ}}$ are provided to the decoder. The nine erasure signals are produced by the inner encoder/decoders associated with the eight data channels and the parity channel, by a flip-flop such as flip-flop 692 in FIG. 6. The signals are zero if the decoded codeword is valid and 1 if there is an error. Thus, a logic 1 signal on one of the erasure inputs indicates that the associated track has an error. The erasure signals 701 are provided to read-only memory 702. Read-only memory 702 (which alternatively may be a single device or an appropriate arrangement of gates or other common circuitry) produces a logical "1" at its output 705 if one and only one of its 9 inputs, 701, is a logic "1". The "one" at the output of ROM 702 enables end gate 706. The other input of AND gate 706 is connected to parity generator 710. Generator 710 produces a logic "1" at its output if there is odd parity (an odd number of logic "ones") in signals 1SRD through 9SRD present at its inputs 711. Thus, AND gate 706 produces a high signal at its output 715 if there is a parity error and if there is a single erasure signal. This condition occurs when an error has been detected in one data track. The signal at the output 715 of AND gate 706 enables AND gate 720. The erasure signal which is high for the corresponding track that has an error is applied through the appropriate one of enabled AND gates 720 to the corresponding exclusive OR gate 725 and added (modulo-2) to the incorrect one of data track 700 to effect a correction of the appropriate data bit.

Synchronization and Skew Correction

The synchronization waveforms produced by the system during initial synchronization are shown in FIG. 11. These waveforms are generated by the timing circuitry shown in FIG. 8 and will be referred to during the following description. As previously mentioned, the decoding operation is controlled by the external utilization device via the RUN signal. Before the start of decoding, the RUN signal is a logical "0" and the RUNR signal (which, as previously described, is the same as the RUN signal reclocked the beginning of one cycle of the bit counter 802) is also "0". The RUNR signal is provided to the upper input of AND gate 855, causing it to produce a low signal at its output. This low signal is applied to the clear input of flip-flop 860 causing it to produce a low signal at its Q output on the signal line INSY which indicates that the system is not in synchronism.

Responsive to a high signal at its input 814 corresponding to a high DECODE signal indicating that the system is in the DECODE mode and a low signal on its lead 815, ROM 810 produces a COMSO signal which is a logic "1" for the first 176 states of the bit counter and a logic "0" for the final 64 states. In addition ROM 810 produces on a pulse on its output CWB at the end of the bit counter interval. This pulse is applied to the upper input of OR gate 865. The lower input of gate 865 is provided with the output from AND gate 870. AND gate 870 is kept turned off by a low signal applied to its upper input from the ENFF output of ROM 810. OR gate 865 therefore applies pulses identical to the CWB signal at its output on lead 866 (signal ALLP) to the K input of flip-flop 693 (FIG. 6) via lead 694. At the end of each cycle of bit counter 802 flip-flop 693 is reset to produce a low signal at its FF output 699.

The low signal produced at the output of flip flop 693 is inverted and is applied as a high signal (FF) to OR gate 526 in FIG. 5. As previously described, gates 526 and 525 control the SHIFT OUT CLOCK applied to FIFO 510. Since the output of gate 526 is high when either of its inputs is high, clock signal ENCK is passed by AND gate 525 for the time during which the COMSO output produced by ROM 810 is high. Therefore, data is shifted out of FIFO 510 for the first 176 states of the bit counter, when COMSO is high, and for an additional one or two clock cycles until flip-flop 693 is set by the output of NOR gate 695 which is provided to the preset input of the flip-flop by lead 696. NOR gate 695, in turn, produces a low signal in response to the signal FMR (on lead 697) becoming high. The signal FMR is produced on lead 921 (FIG. 9) by AND gate 920, whose lower input is held high by the output of OR gate 903 (on lead 907) enabling gate 920 to pass the signal FIFOMR which signal is generated by ROM 810 as previously described. OR gate 903 is, in turn, enabled by a high signal on its lower input provided by a high signal on lead $\overline{\text{INSY}}$. This operation is shown in lines A through D, F and G of FIG. 11.

The decoding operation begins when the RUN signal switches to a logic "1". The signal RUNR becomes a logic "1" at the end of the final count of the bit counter, as previously described. When the signal RUNR becomes high, ROM 810 applies a high signal for the full 240 bit interval on its output lead COMSO as shown in line F of FIG. 11.

As previously described, the high output on the COMSO signal allows 240 bits to be shifted out of FIFO 510 and into the inner encoder/decoder as shown in FIG. 6.

In FIG. 8 the high signal on the RUNR lead is applied to the upper input of AND gate 855. The lower input of AND gate 855 is connected to the DECODE signal which is high at this time. AND gate 855 therefore produces a high signal at its output. This high signal is applied to the upper input of AND gate 871. The lower input of AND gate 871 also receives the high signal at this time and therefore applies a high signal to the clear input of flip-flop 880. Flip-flop 880 is therefore allowed to operate. During the last bit of the 240 bit interval during which bits are shifted into the inner encoder/decoder, ROM 810 produces a high signal at its output CWB which is applied to the J input of flip-flop 880. During the next clock pulse received on the ENCK signal line, flip-flop 880 is set to produce a high signal at its output Q. This high signal is applied via lead 881 to the upper input of AND gate 882. AND gate 882 receives a high signal at its lower input via inverter 883 which is connected to the output of gate 870. A low signal on the ENFF output of ROM 810 is applied to the upper input of gate 870 holding its output low at this point. AND gate 882 therefore produces a high output on lead 884 which is applied to the CMSBSR signal line as shown in line E of FIG. 11.

Figure 9:
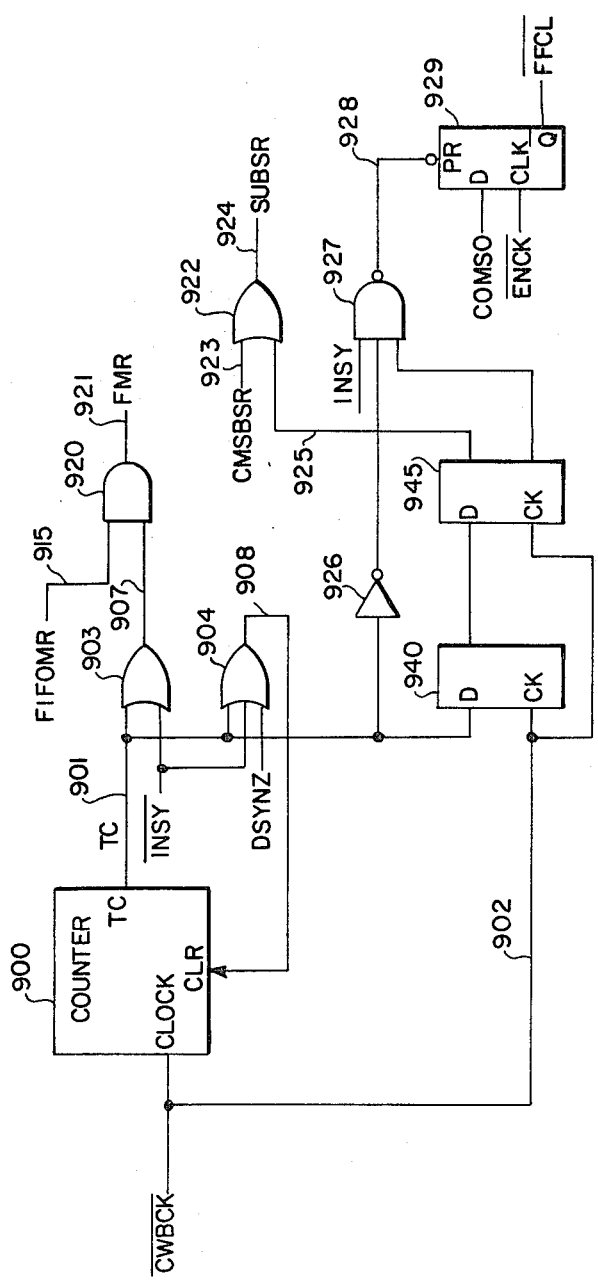
FIG. 9 shows the inner encoder/decoder resynchronization circuits.
Figure 10:
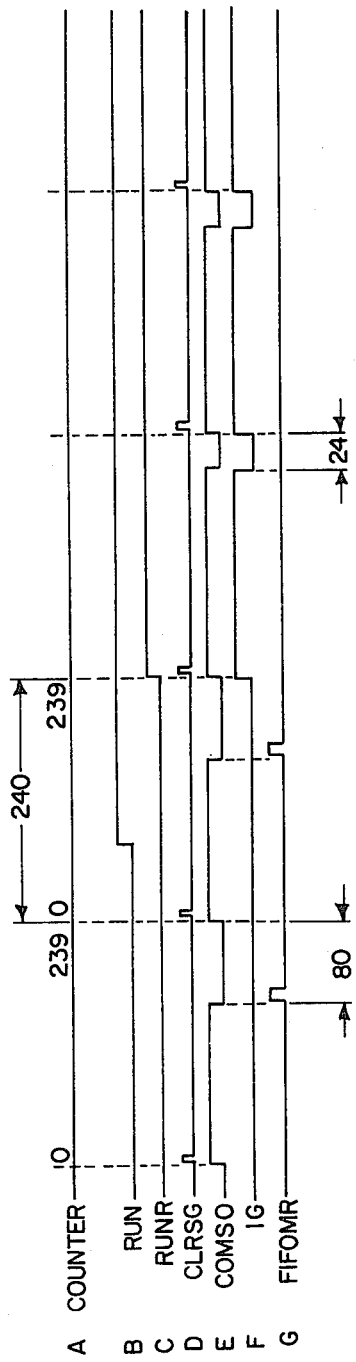
FIG. 10 shows the encoding waveforms produced by the circuitry.

The CMSBSR signal line is applied to the upper input of OR gate 922 in FIG. 9 producing a high output on the signal line SUBSR. The high signal on signal line SUBSR is applied via lead 663 in FIG. 6 to inverter 662 and AND gate 664. The low signal at the output of inverter 662 disables gate 661. Gate 664, however, is enabled by the high signal on the signal line SUBSR. As described below, AND gate 664 allows a delayed version of the input data bits to be selectively added to the contents of the shift register consisting of flip-flop 600 through 623. This operation allows each code word to be processed on a bit by bit basis as described below.

In accordance with the invention, the contents of the shift register are kept current; that is, at each bit time a new bit from FIFO 510 enters the shift register via lead 668 and exclusive-OR gate 665, the contents of the register are altered so as to delete the effect of the bit previously entered into the shift register 240 bit times earlier and to add the effect of the new bit. The deletion is accomplished by subtracting from the shift register the effect of a single bit shifted through the register. If this single bit is a 0, then there is no effect. If the single bit is a "1" then the effect depends on the exact shift register feedback configuration. In the illustrative example, the effect of shifting a single one through the register is to complement the input to the 10th stage flip flop (609) of the shift register. If other codes and/or cosets are used in the encoding of the data, then the effect produced by a single one shifting through the register would be different and require different connections as would be apparent to those skilled in the art.

In the specific embodiment, the output of delay circuit 550 is supplied, via AND gate 664, to exclusive-OR gate 641. Since delay circuit 550 delays its input for 240 bit times, each bit at its output is equivalent to a bit input into the shift register 240 bit times earlier. If this bit is a zero, then there is no effect. If it is a one, then the output of exclusive-OR gate 640 is complemented by exclusive-OR gate 641 (in effect subtracting the effect of the first bit introduced into the shift register). The register contents are therefore a function of the syndrome of the most recent 240 bits from FIFO 510.

When a valid code word is detected at any bit time, the output 691 of AND gate 690 becomes high as previously described. On the next bit if FFCL is a logic "1", flip-flop 693 is set and produces a logic "1" at its output 699. This causes the signal $\overline{\text{FF}}$ to become zero which disables AND gate 525 in FIG. 5 stopping the shifting out of FIFO 510. In addition, the high signal at the output of AND gate 690 is applied to OR gate 830 in FIG. 8. OR gate 830 applies a high signal to the upper input of AND gate 835. Since the lower input of AND gate 835 is connected to the signal line CMSBSR, which is also high at this time, AND gate 835 produces a high signal which is applied to the reset input of bit counter 802, resetting the counter to zero. Bit counter 802 then begins counting a new code word interval.

The operation for each channel continues in an analogous manner. When a valid code word is detected, the corresponding flip-flop is set to one and the bit counter is reset to zero. This operation is shown in FIG. 11.

In order to avoid synchronization from taking too long (for example, if one channel has a codeword boundary pass through immediately before RUNR becomes high) the CMSBSR signal is applied to ROM 810 via lead 817. Specifically, the search for valid codewords is terminated if 88 bit times elapse following the last recognition of a codeword and codewords have not been detected for one or more tracks. Since the FIFO's, as previously described were initially filled with approximately 62 bits, and each FIFO has a capacity of 128 bits, the system is capable of compensating for approximately 66 bits of skew. An attempt at synchronization may fail because of errors on one or more tracks or, as illustrated in FIG. 11, because the search for valid codewords, which occurs when both CMSBSR and ENFF are high, starts just after codeword boundaries for one or more early channels have passed by.

If not all flip flop signals FF are set to logic "1" after 88 counts of bit counter 802, ROM 810 sets the ENABLE FLIP FLOP signal ENFF to zero. This disables AND gate 870. In addition, ROM 810 causes the FIFO master reset line FIFOMR to receive a high pulse which appears as FMR on lead 921 of each inner encoder/decoder, clearing, all of the FIFO's. This pulse also appears on lead 697 which produces a low signal at the output of NOR gate 695. This low signal is applied, via lead 696, to the preset input of flip flop 693 setting it to one. In a like manner all other corresponding flip flops are set to one. The shift-out clocks for the FIFO's are inhibited, since COMSO and $\overline{\text{FF}}$ are both logic "0", blocking AND gate 525 via OR gate 526.

At count 151 of the bit counter, a logic "1" pulse is generated on lead CWB by ROM 810 resetting the bit counter 802 to zero. On the next pulse a logic "1" pulse is produced on the CLRSG lead by ROM 810 which, via AND gate 661 and lead 669 clears the shift registers in preparation for another cycle. ROM 810 puts a high signal on lead COMSO and the next 240 bits are read into the inner encoder/decoder as described previously. The FIFO's have been filled with approximately 62 bits as before, and the bit counter has been advanced in phase 88 bit times, permitting detection of valid codewords which were too early to be detected on the first attempt.

Synchronization occurs if all flip flop signals FF are set to logic "1" within an 88 bit count of the bit counter 802 following the signal CMSBSR switching to logic "1". When this condition exists a pulse is produced on the ALL signal line (which is the individual FF signals ANDed together). The ALL signal is applied to inverter 883, causing a low signal to be applied to AND gate 882. The ALLP signal, produced by OR gate 865 in response to the ALL signal, clears all of the FF flip flops to logic "0". The ALL signal, applied to the J input of flip flop 860, causes INSY to become a logic "1" one bit time later.

The change in CMSBSR is also sensed by ROM 810 via lead 817 and in response ROM 810 places a high signal on its output COMSO. The SHIFT OUT CLOCK signals to all FIFO's are gated on by the signal COMSO switching to logic "1". Since all FIFO's have been stopped with the first bit of the new code word at the last position at the point when the signal COMSO switches to logic "1" the system is synchronized with skew corrected provided that the skew between tracks does not exceed the capacity of FIFO's.

Resynchronization

In the event that one inner encoder/decoder fails to detect valid codewords after synchronization is achieved, no DSYNZ signal is generated by gate 690 in FIG. 6. Each time an error-free codeword is not detected at the codeword boundary pulse produced by ROM 810 (signal CWB) a counter 900 shown in FIG. 9 is advanced one count by the clock $\overline{\text{CWBCK}}$, generated by the timing circuits in FIG. 8. The circuit in FIG. 9 is associated with each data track. If, on the other hand, a correct codeword is received in the data track, a pulse on signal lead DSYNZ occurs at the time of pulse CWB and the counter 900 is cleared to zero. Specifically, the pulse on signal lead DSYNZ is applied to OR gate 904 which in turn applies a high signal to the clear input of counter 900. If a sufficient number (e.g., four) of successive codewords are in error, counter 900 reaches a terminal count, causing its output TC to switch to a logic "1". This change in output causes an attempt at resynchronization of the inner encoder/decoder to be made. The waveforms involved are shown in FIG. 12. During the word time when TC is a logic "1", the clear signal $\overline{\text{FFCL}}$ in FIG. 9, normally at logic "0", switches to a logic "1" in response to a change in signal COMSO, which is a logic "1" for the first 120 bits of each codeword, and logic "0" for the last 120 bits as shown in line E of FIG. 12. The signal FIFOMR, after initial synchronization (when the signal INSY is a logic "1") occurs approximately 15 bits prior to the end of the codeword, setting the FF flip-flop 693 in FIG. 6 to logic "1" via signal FMR which is produced by AND gate 920 in FIG. 9 which is enabled by the output TC of counter 900 via OR gate 920. The FIFO 510 is also cleared by the signal FMR, and approximately 14 bits are read in while the shift-out clock is inhibited by both $\overline{\text{FF}}$ and COMSO being logic 0 and thus disabling gate 525 shown in FIG. 5. At the start of the next codeword, the signal FF produced by flip-flop 693 goes to zero in response to the signal ALLP becoming a logic "1". This happens because of a logic "1" produced on signal lead CWB by ROM 810 during state 239 of the bit counter 802. Signal $\overline{\text{FF}}$ therefore becomes a logic "1" and AND gate 525 is enabled. The shift-out of data from FIFO 510 therefore resumes with FIFO 510 containing only 14 bits, approximately. Data from FIFO 510 is fed to the inner encoder/decoder. After 240 bits have been shifted into the inner encoder/decoder, the signal SUBSR for the innner encoder/decoder which suffered loss of synchronization becomes high. This happens when a flip-flop in the associated resynchronization circuitry is set. For example, in FIG. 9, flip-flop 945 is set after one codeword interval from the high output of flip-flop 940. The high signal at the output 925 of flip-flop 945 causes OR gate 922 to place a high signal on its output 924 and thence to the signal line SUBSR. Since the signal CMSBSR is held at logic "0" after the signal INSY is set to logic "1", the signal SUBSR lasts one codeword, or 240 bit times, and is a replica of the signal TC, delayed two codewords by the two cascaded flip-flops 940 and 945. As occurs during initial synchronization, previously described, after the first 240 bits are read into the inner encoder/decoder, the signal SUBSR switches to logic "1" and, via gate 664, causes the effect of a data bit which was shifted into the shift register 240 bits prior to the current bit to be canceled, so that the shift register, consisting of flip-flops 600–623 in FIG. 6, contains bits which are a function of the syndrome of the latest 240 bits.

When a valid codeword is recognized, the signal DSYNZ becomes a logic "1" for one bit time as previously described, setting flip-flop 693 and producing a logic "1" on signal lead FF. Gate 525 is thereby disabled, stopping the shift out clock to FIFO 510. The shifting out of FIFO 510 is restarted at the following state 0 of the bit counter 802, and the new codeword, whose first bit was in readiness at the FIFO output, is shifted out. Resynchronization has been accomplished. In the event that the resynchronization attempt is unsuccessful, counter 900 of FIG. 9 recycles from its terminal count to zero, and another attempt is initiated.

What is claimed is:

1. Skew correction apparatus for use in a digital information processing system wherein a stream of digital data is broken into a plurality of sequenced parallel streams to be processed simultaneously by said data processing system, said correction apparatus comprising, means for dividing said digital data in each of said parallel streams into blocks of predetermined length;

means responsive to the data signals in each of said blocks for computing a coded parity word;

means for associating said parity words with the corresponding data block to form a codeword;

means for assembling said codewords into an encoded data stream to be processed;

means responsive to data in each of said encoded data streams and operative subsequent to said processing of said data for detecting a codeword in each of said encoded data streams;

means responsive to the detection of a codeword for temporarily storing portions of the associated data stream; and means responsive to the detection of a codeword on every one of said encoded data streams for simultaneously reading data out of said storage means.

2. Skew correction apparatus according to claim 1 wherein said means for associating said parity word with said data block comprises
- means for temporarily storing each of said sequential data blocks;
- means for temporarily storing said parity word; and
- means for alternately reading data out of said means for storing said data block and said means for storing said parity word whereby an encoded data stream is produced having alternate data blocks and parity words.

3. Skew correction apparatus according to claim 1 wherein said means for temporarily storing portions of each data stream comprises
- a first-in, first-out buffer associated with each of said encoded data streams;
- means responsive to data in each of said encoded data streams for inserting each bit of said encoded data stream into the associated buffer;
- means for shifting said encoded data in serial fashion out of said buffer; and
- means responsive to the detection of a codeword in a data stream for disabling the shifting means in the associated buffer.

4. Decoding apparatus for use in error detecting circuitry which encodes a digital data stream by breaking the stream up into predetermined data blocks and inserting after each data block a parity word computed from data bits in the stream to form an encoded stream of codewords, each codeword consisting of an associated parity word and data block, said decoding apparatus comprising,
- means responsive to said encoded stream of codewords for temporarily storing a number of codeword bits equal to the length of a codeword;
- means responsive to said temporarily-stored bits for computing a mathematical function having a value which indicates whether said bits in said storage constitute a codeword or not;
- means responsive to said function value for adding an additional bit to said storage bits if said storage bits do not constitute a code word;
- means responsive to said value for removing the first bit stored in said storage means if said mathematical function indicates that said stored bits do not constitute a codeword; and
- means for removing the effect of said last-removed bit from said mathematical function whereby a new mathematical function is generated corresponding to the bits then stored in said storage means.

5. A method for correcting skew errors in a system for processing parallel streams of digital information wherein, prior to processing, error correction codes are computed from portions of said information in each stream and periodically inserted into the corresponding stream, said method comprising the steps of:
- A. examining each processed stream of information to detect the position in said stream of an error correcting code, and
- B. using the relative positions of error correcting codes in each stream to correct skew errors between the streams.

6. A method for correcting skew errors according to claim 5 wherein step A further comprises the steps of:
- C. continuously examining a fixed-length sections of each processed stream of information, and
- D. detecting the occurrence of an error correcting code in said sections.

7. A method for correcting skew errors according to claim 5 wherein step B further comprises the steps of:
- E. generating a synchronizing signal associated with an information stream when an error correcting code is detected in the section associated with that stream,
- F. temporarily storing processed information in a stream when a synchronizing signal is generated for that stream, and
- G. simultaneously reading information out of said storage means for each information stream when synchronizing signals have been detected for all information streams.

8. Apparatus for correcting skew errors in a system for processing parallel streams of digital information wherein, prior to processing, error correction codes are computed from portions of said information in each stream and periodically inserted into the corresponding stream, said apparatus comprising
- means responsive to each processed stream of information for detecting the position in said stream of an error correcting code,
- means for generating a synchronizing signal associated with an information stream when an error correcting code is detected in that stream,
- storage means associated with each stream for temporarily storing processed information in the associated stream when a synchronizing signal is generated for that stream, and
- means for simultaneously reading information out of all of said storage means when synchronizing signals have been detected for all information streams.

9. Apparatus for correcting skew errors according to claim 8 wherein said detecting means further comprises means for continuously examining a fixed-length section of each processed stream of information, and means for detecting the occurrence of an error correcting code in said section.

10. Synchronizing apparatus for use in a digital information processing system wherein a stream of digital data bits is broken into a plurality of sequenced parallel bit streams to be processed simultaneously by said data processing system, and the digital data in each of said parallel streams is divided into blocks of predetermined bit length; said synchronizing apparatus comprising,
- means, operable prior to processing, for periodically inserting a coded information block computed from bit values in said data blocks into each bit stream,
- means responsive to each processed data bit stream for detecting a coded information block in each stream,
- means responsive to the detection of a coded information block in a processed data bit stream for temporarily storing portions of the associated stream, and
- means responsive to the detection of a coded information block on every one of said processed data streams for simultaneously reading data bits out of said storage means.

11. Synchronizing apparatus according to claim 10 wherein said means for periodically inserting a coded information block into said data bit streams commprises means responsive to data in each of said blocks for computing a bit pattern based on the value of said data bits in said block and means for inserting said pattern into said data bit stream adjacent to the corrresponding data bit block.

12. Synchronizing apparatus according to claim 10 wherein said means for temporarily storing portions of said data bit stream comprises,
a first-in, first-out buffer associated with each of said processed data streams;
means responsive to data in each of said processed data streams for inserting each bit of said processed data stream into the input of the associated buffer;
means for shifting said processed data in serial fashion out of said buffer; and
means responsive to the detection of a coded information block on the associated data stream for disabling said shifting means.

13. Skew correction apparatus for use in a digital information processing system wherein a time sequence of digital data bits is broken into a plurality of parallel bit streams to be processed simultaneously by said data processing system, and wherein, prior to processing, said data in each of said streams is divided into blocks of predetermined bit length, and error correction code bits are computed from the data in each of said blocks and inserted into said stream adjacent to said corresponding block to form a stream of codeword bits, said correction apparatus comprising,
means for examining a fixed bit length section of each processed stream of codewords and, responsive to the occurrence of a codeword in said section, for generating a synchronizing signal associated with said data stream,
means responsive to each synchronizing signal for temporarily storing processed data in the corresponding stream; and
means responsive to the generation of synchronizing signals associated with every one of said encoded data streams for simultaneously reading data out of said storage means for each data stream.

14. Skew correction apparatus according to claim 13 wherein said examining means comprises a first-in first-out buffer store associated with each codeword stream, means for shifting codeword bits into said buffer stores and means for shifting codeword bits out of said buffer stores and means, associated with each buffer store for detecting the presence of an entire codeword in said buffer store.

15. Skew correction apparatus according to claim 14 wherein said means for temporarily storing said data bits comprises means responsive to said synchronizing signal for disabling said shifting out means.

16. Skew correction apparatus according to claim 15 wherein said means for simultaneously reading data out comprises means responsive to synchronizing signals associated with every one of said data streams for reenabling said shifting out means.

17. A method for correcting skew errors in a digital information processing system wherein a time sequence of digital data blocks is broken into a plurality of parallel streams to be processed simultaneously by said data processing system, and wherein, prior to processing, an error correction code is computed from the data in each of said blocks and inserted into said stream adjacent to said corresponding block to form a stream of codewords, said method comprising the steps of:
A. continuously examining a section of each processed code word stream,
B. generating a synchronizing signal associated with said data stream when a codeword is detected in said section,
C. temporarily storing processed codewords in a stream when a synchronizing signal is generated for that stream, and
D. simultaneously reading data out of said storage means for each codeword stream when synchronizing signals have been detected for all codeword streams.

18. A method for correcting skew errors according to claim 17 wherein said processing means further comprises a first-in first-out buffer store associated with each codeword stream and step A comprises the steps of:
E. shifting codeword bits into said buffer stores,
F. shifting codeword bits out of said buffer stores at the same rate as the bits are shifted in, and
G. examining the set of bits in said buffer store.

19. A method for correcting skew errors according to claim 18 wherein step B comprises the step of stopping shifting of bits out of each of said buffer stores when a synchronizing signal is generated for the corresponding data stream.

20. A method for correcting skew errors according to claim 19 wherein step D comprises the step of resuming shifting out of data from all of said buffer stores when a synchronizing signal has been generated for all of said data streams.

21. Skew correction apparatus for use in a digital multi-track magnetic tape system in which the data recorded on each tape track is divided into blocks of predetermined length and an error correcting code, computed from the values of the bits in each data block, is inserted after the block to form a track of codewords, each codeword consisting of a data block and associated error correcting code pattern, said correction apparatus comprising,
a first-in first-out buffer store associated with each track,
means for continuously shifting codeword bits recorded on the associated track into said buffer store,
means for continuously shifting codeword bits out of said buffer store,
means, associated with each buffer store and responsive to the presence of bits constituting an entire codeword in said buffer store for generating a synchronizing signal for the associated track,
means responsive to a synchronizing signal for disabling said shifting out means to temporarily store data recorded on a track in the associated buffer store, and
means responsive to the generation of synchronizing signals associated with every track for simultaneously shifting data out of each buffer store so that track-to-track skew is eliminated.

22. Skew correction apparatus according to claim 21 wherein said synchronizing signal generating means comprises means responsive to the values of bits in a predetermined number of stages of said buffer store for computing a mathematical function having a first value when the values of said bits indicate the presence of a codeword in said buffer and a second value when the values of said bits do not indicate the presence of a codeword in said buffer.

23. Skew correction apparatus according to claim 22 wherein said synchronizing signal generating means further comprises means responsive to said first function value for generating said synchronizing signal.

24. Skew correction apparatus according to claim 23 wherein said means for simultaneously shifting data out of each buffer store comprises means responsive to synchronizing signals associated with every one of said tracks for reenabling said shifting out means for each buffer store.

25. Apparatus for detecting an occurrence of a predetermined data bit pattern in a stream of digital data bits, said apparatus comprising,
   means for simultaneously detecting the values of bits in a set of bits having a fixed number of bits in said stream,
   means for computing a mathematical function from said bit values which function has a first value when the set comprises said pattern and a second value when the set does not comprise said pattern,
   means responsive to said second function value for replacing the value of at least one bit in said set with the value of a bit which is not included in said set of bits, and
   means for correcting said function to account for the the value of the replaced one bit.

26. Apparatus for detecting an occurence of a predetermined data bit pattern in a stream of digital data bits according to claim 25 wherein said detecting means comprises means responsive to said bit stream for temporarily storing the values of a fixed number of bits equal to the number of bits in said pattern.

27. Apparatus for detecting an occurence of a predetermined data bit pattern in a stream of digital data bits according to claim 26 wherein said replacing means comprises means for storing the value of an additional bit in said storing means and means for removing the value of a bit already stored in said storage.

28. Apparatus for detecting an occurence of a predetermined data bit pattern in a stream of digital data bits according to claim 27 wherein said correcting means comprises means responsive to the value of said additional bit for modifying the value of said function to account for the replaced bit.

29. Decoding apparatus for use in a digital multi-track magnetic tape system in which the data recorded on each tape track is divided into blocks of predetermined length and an error correcting code, computed from the values of the bits in each data block, is inserted after the block to form a stream of codewords, each codeword consisting of a data block and associated error correcting code pattern, said decoding apparatus comprising,
   means responsive to data recorded on a track for temporarily storing a number of bits equal to the length of a codeword,
   means responsive to said temporarily stored bits for computing a mathematical function having a value which indicates whether said bits in said storage constitute a codeword or not,
   means responsive to said function value for adding an additional bit to said storage bits if said storage bits do not constitute a codeword,
   means responsive to said function value for removing one bit stored in said storage means if said value indicates that said stored bits do not constitute a codeword, and
   means for correcting said mathematical function to remove the effect of said last-removed bit from said storage means whereby a new mathematical function is generated corresponding to the bits then stored in said storage means.

* * * * *